US010339390B2

(12) United States Patent
Shen

(10) Patent No.: US 10,339,390 B2
(45) Date of Patent: Jul. 2, 2019

(54) METHODS AND APPARATUS FOR AN IMAGING SYSTEM

(71) Applicant: SEMICONDUCTOR COMPONENTS INDUSTRIES, LLC, Phoenix, AZ (US)

(72) Inventor: Rui Shen, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 335 days.

(21) Appl. No.: 15/174,581

(22) Filed: Jun. 6, 2016

(65) Prior Publication Data

US 2017/0243069 A1 Aug. 24, 2017

Related U.S. Application Data

(60) Provisional application No. 62/298,656, filed on Feb. 23, 2016.

(51) Int. Cl.
*G06K 9/00* (2006.01)
*G01B 11/00* (2006.01)
*G06K 9/52* (2006.01)
*G06T 7/00* (2017.01)
*G06K 9/62* (2006.01)
*G06T 7/60* (2017.01)
*G06T 7/80* (2017.01)

(52) U.S. Cl.
CPC ........ *G06K 9/00791* (2013.01); *G01B 11/002* (2013.01); *G06K 9/52* (2013.01); *G06K 9/6215* (2013.01); *G06T 7/60* (2013.01); *G06T 7/80* (2017.01); *G06T 2200/04* (2013.01); *G06T 2207/20076* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,666,173 B2 | 3/2014 | Huggett | |
| 2007/0071311 A1* | 3/2007 | Rovira-Mas | G06T 7/70 382/154 |
| 2008/0007619 A1 | 1/2008 | Shima | |
| 2008/0273751 A1* | 11/2008 | Yuan | G06K 9/32 382/103 |

(Continued)

OTHER PUBLICATIONS

Miksch et al., Automatic extrinsic camera self-calibration based on homography and epipolar geometry, IEEE symposium, Jun. 2010, pp. 832-839, Intelligent Vehicles Symposium (IV).

(Continued)

*Primary Examiner* — Frederick D Bailey
(74) *Attorney, Agent, or Firm* — The Noblitt Group, PLLC; Hettie L. Haines

(57) ABSTRACT

Various embodiments of the present technology may comprise a method and apparatus for an on-vehicle camera system capable of calibrating the camera's orientation (i.e. pitch, yaw, roll angles) in relation to the vehicle's coordinate system utilizing normally-encountered imagery. The method and apparatus may comprise utilizing an image processor to detect features from pixel data of image frames, match features, provide an estimated orientation, and validate the orientation. A system utilizing the method and apparatus may transmit the camera's orientation with respect to the vehicle coordinate system to a peripheral system.

19 Claims, 11 Drawing Sheets

(56) References Cited

U.S. PATENT DOCUMENTS

Figure 1:
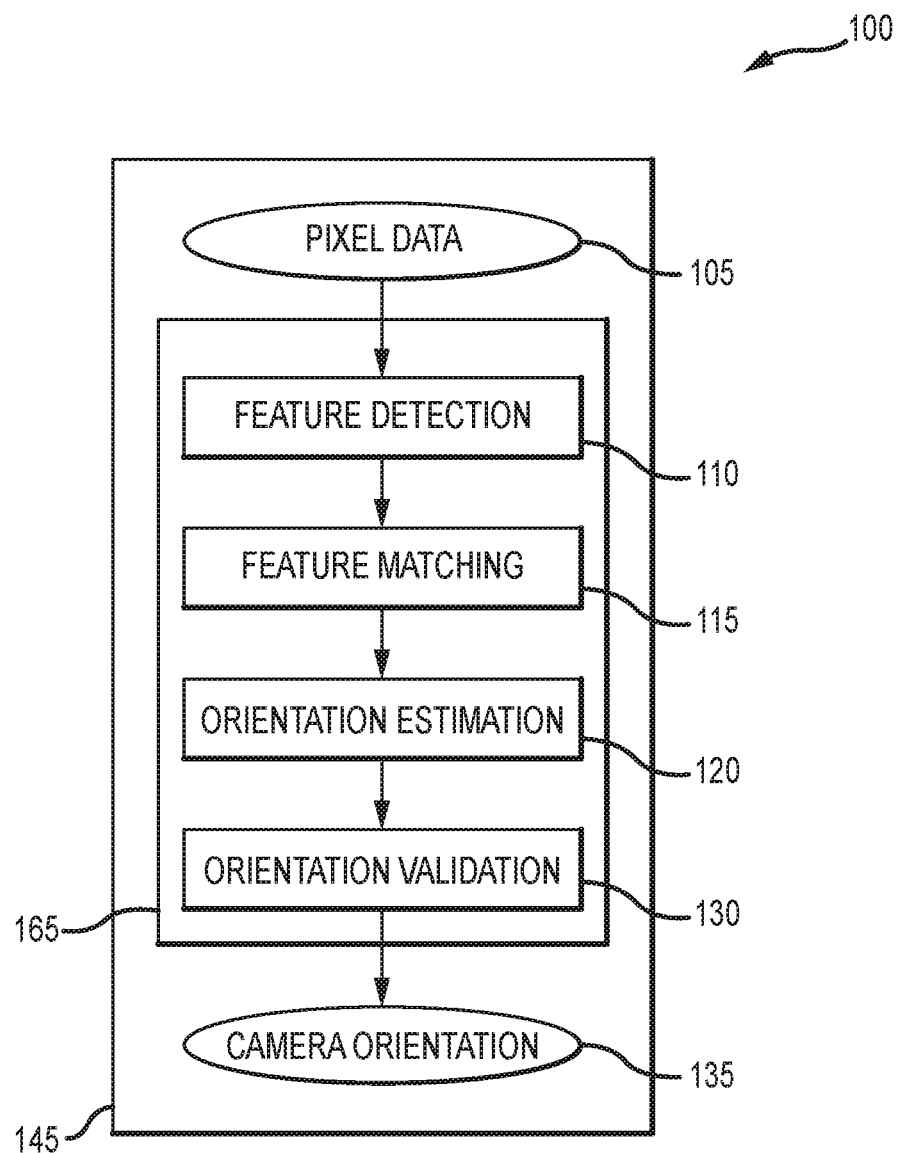

| | | | |
|---|---|---|---|
| 2009/0290032 A1 | 11/2009 | Zhang | |
| 2010/0097458 A1* | 4/2010 | Zhang | G06K 9/00798 348/119 |
| 2010/0253784 A1 | 10/2010 | Oleg | |
| 2011/0115912 A1 | 5/2011 | Kuehnle | |
| 2013/0057718 A1* | 3/2013 | Tateishi | G06K 9/6202 348/222.1 |
| 2015/0036885 A1 | 2/2015 | Pflug | |
| 2015/0161818 A1* | 6/2015 | Komenczi | G06T 17/00 348/43 |
| 2015/0346343 A1* | 12/2015 | Cho | G01C 3/08 356/3.09 |
| 2016/0182873 A1* | 6/2016 | Sumiyoshi | H04N 9/3185 348/747 |
| 2017/0061623 A1* | 3/2017 | Jaehnisch | G06T 7/20 |
| 2017/0200293 A1* | 7/2017 | Solem | G06T 11/206 |
| 2018/0144213 A1* | 5/2018 | Nieuwlands | G06K 9/6232 |

OTHER PUBLICATIONS

Hold et al., A novel approach for the online initial calibration of extrinsic parameters for a car-mounted camera, IEEE conference, Oct. 2009, pp. 1-6, Intelligent Transportation Systems, 2009.

Li et al., Easy calibration of a blind-spot-free fisheye camera system using a scene of a parking space, IEEE journal, Mar. 2011, pp. 232-242, vol. 12, issue 1, IEEE Transactions on Intelligent Transportation Systems.

Heng et al., Infrastructure-based calibration of a multi-camera rig, IEEE conference, May 2014, pp. 4912-4729, 2014 IEEE International Conference on Robotics and Automation.

* cited by examiner

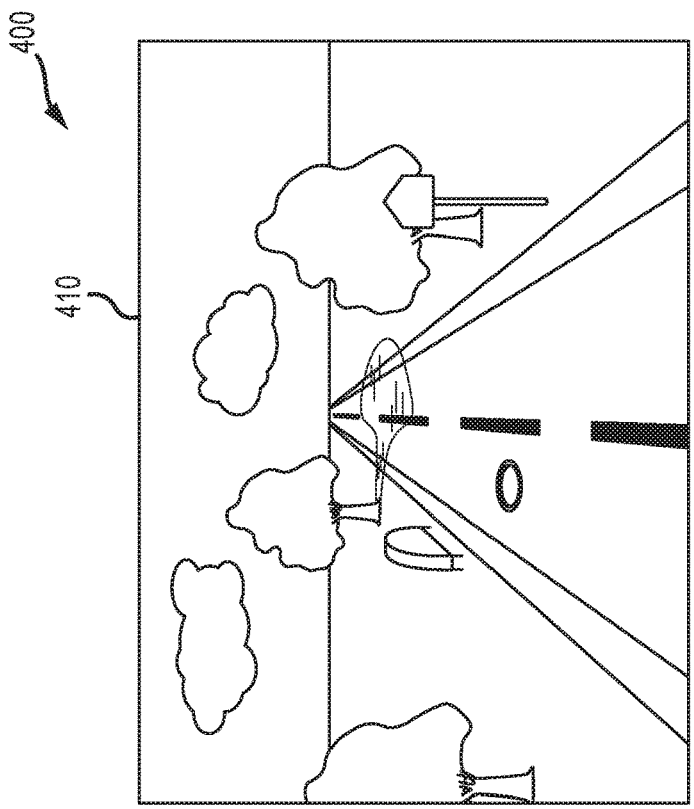
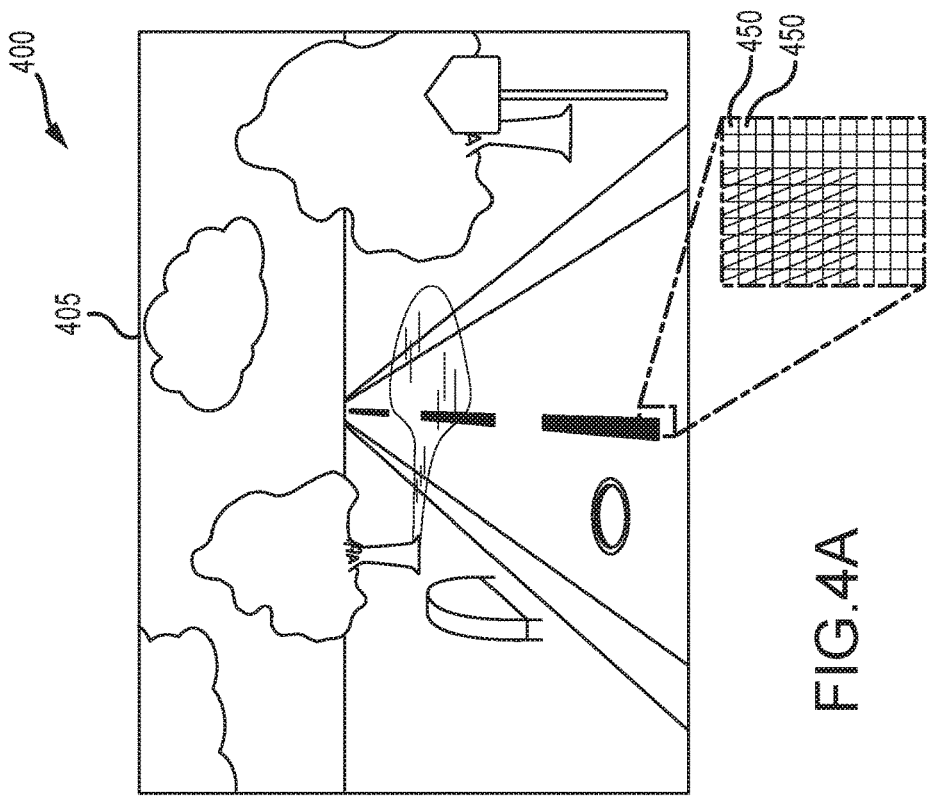
FIG.4B
FIG.4A

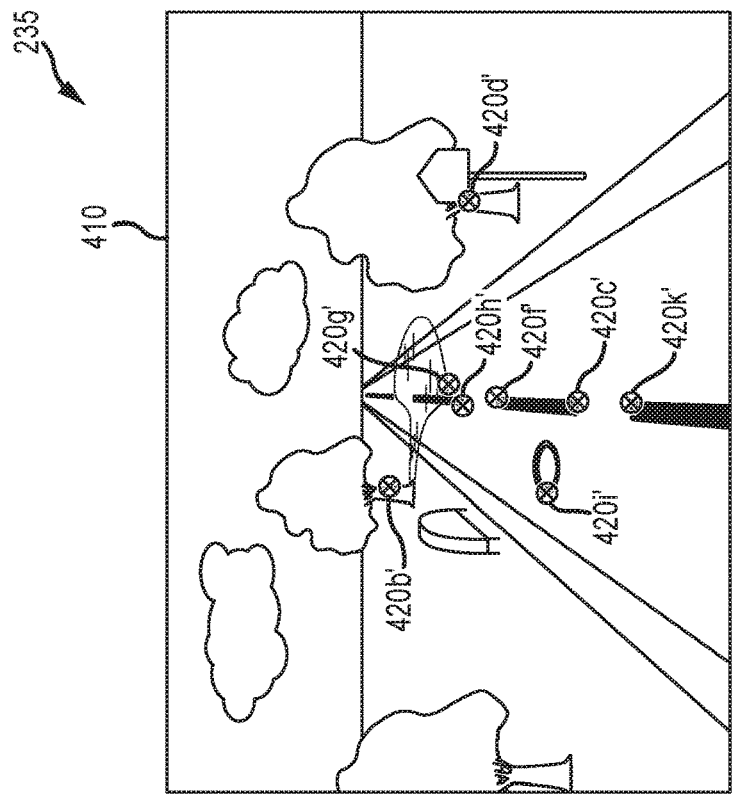
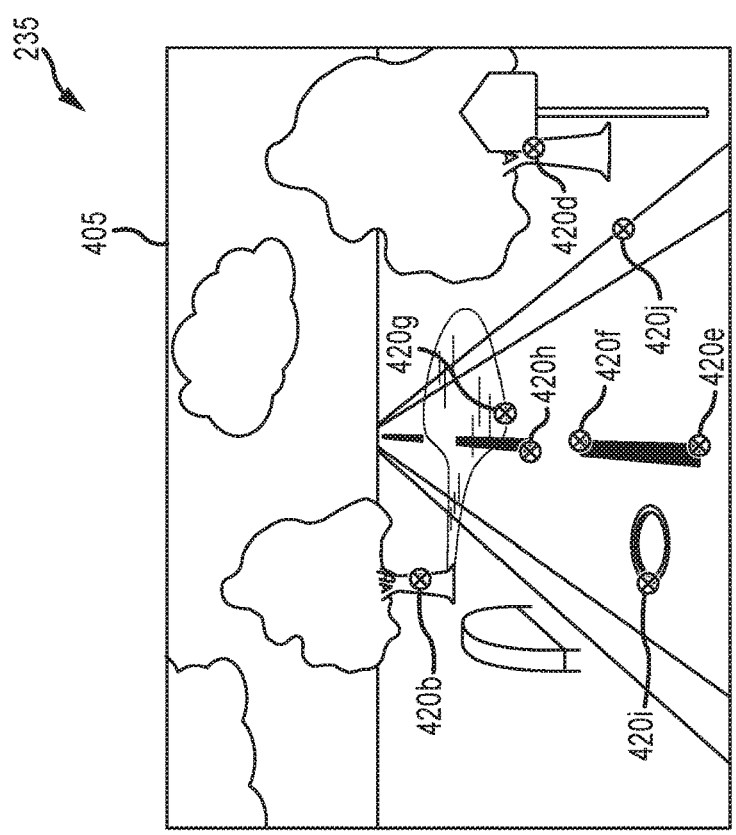
FIG. 4F
FIG. 4E

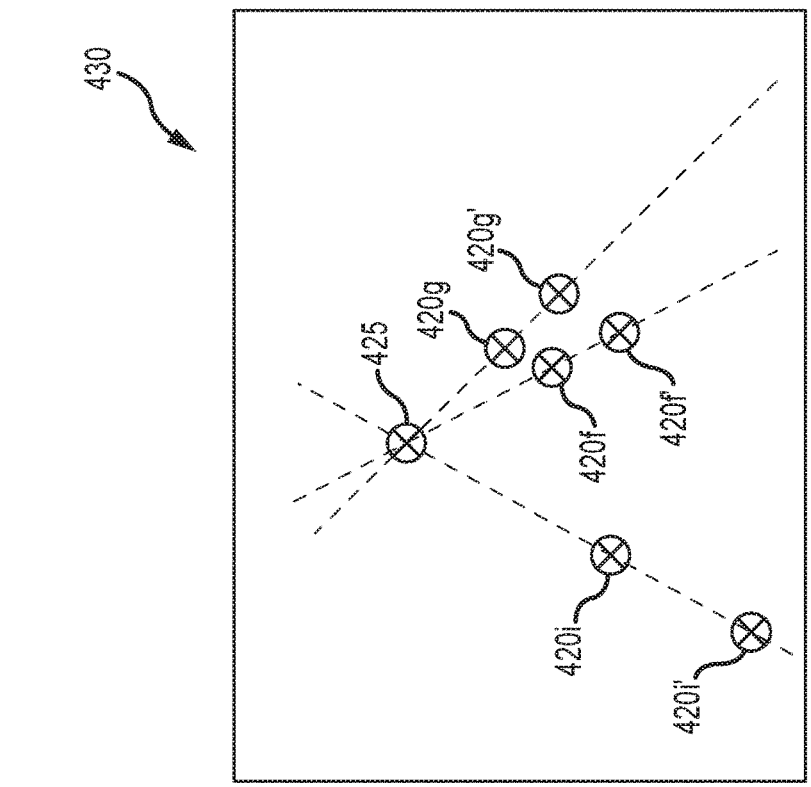
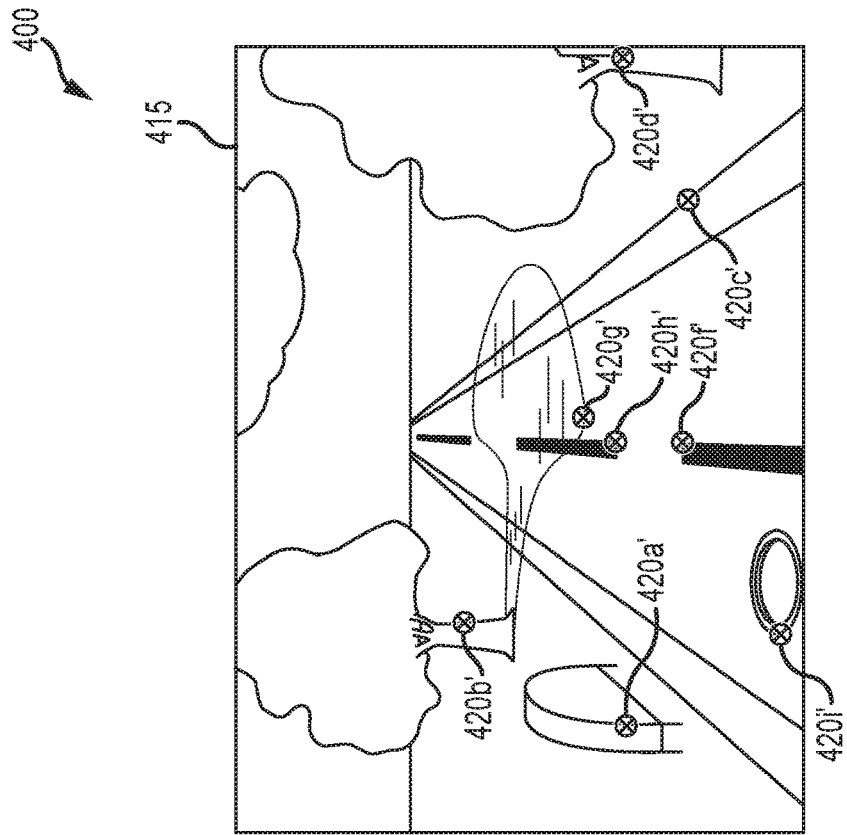
FIG. 4J
FIG. 4I

METHODS AND APPARATUS FOR AN IMAGING SYSTEM

CROSS-REFERENCE TO RELATED APPLICATION(S)

This application claims priority to U.S. Provisional Application No. 62/298,656, filed on Feb. 23, 2016, entitled "Methods and Apparatus for an Imaging System," invented by Rui Shen, and is incorporated herein by reference and priority thereto for common subject matter is hereby claimed.

BACKGROUND OF THE TECHNOLOGY

An accurate estimate of camera orientation with respect to a specific reference, such as the vehicle supporting the camera, facilitates many image processing and computer vision functionalities. Such functionalities include, but are not limited to, view synthesis (e.g., generating images from different viewing perspectives using a single backup camera, stitching images from surround-view cameras to form a panoramic image, etc.), object detection (e.g., detecting lanes, detecting obstacles on the road, etc.), and three-dimensional (3D) reconstruction (e.g., recovering the 3D structure of the scene using stereo matching from a pair of cameras or using structure from motion from a single camera), which are common components in advanced driver assistance systems (ADAS). A camera's orientation may be represented using several interchangeable representations, which include but are not limited to Euler angle representation (i.e., pitch, yaw, and roll angles following a predefined rotation order), rotation matrix representation, quaternion representation, and axis-angle representation.

Conventional camera orientation estimation uses specially-designed patterns, such as grid patterns, and time-consuming and error-prone techniques. Additionally, if the camera position changes, such as when the vehicle supporting the camera gets into an accident, the camera must be re-calibrated with special equipment and procedures to re-estimate the camera orientation.

Installing inertial measurement units (IMUs) on a camera has limited applicability due to the diminished precision and durability of consumer-grade IMUs and the high cost of higher-grade IMUs.

Other solutions for automatic camera orientation estimation without specially-designed patterns generally employ conventional feature detectors and feature matchers that either directly use local image patches or rely on high-dimensional feature vectors extracted from those patches to describe and match features. These feature detectors and feature matchers generally require the use of a frame buffer to hold an image, which consumes a great deal of power and adds a substantial cost to design. Techniques employing model fitting methods that heavily rely on linear system solvers also require more storage and power, which lead to a higher cost calibration system. Techniques estimating only one or two rotation angles generally assume that the rest of the rotation angles are known and remain constant. This assumption limits the applicability of such techniques.

Given the limitations of existing calibration methods and the limitations of IMUs, a low cost, low-power consumption calibration method with the capability of automatic camera orientation estimation without specially-designed patterns is desirable. Such capability is herein referred to as self-calibration.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 2:
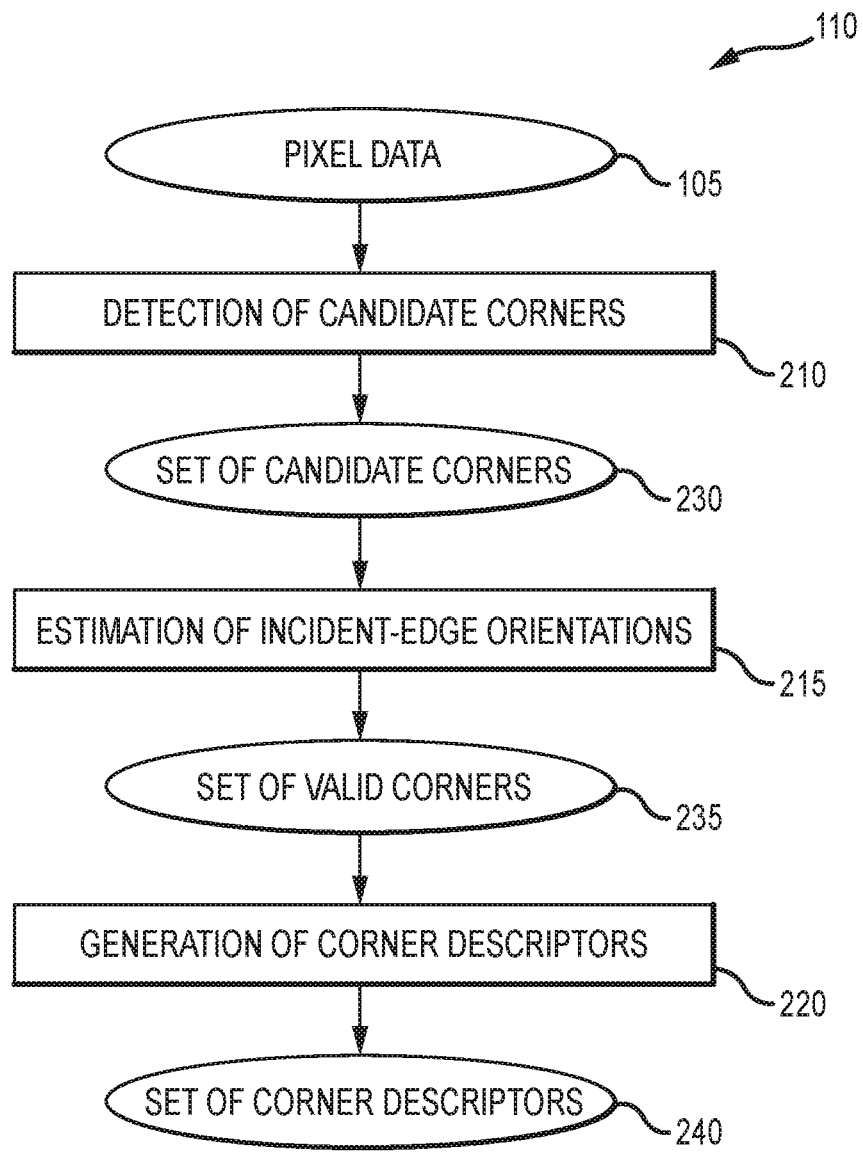
Figure 3:
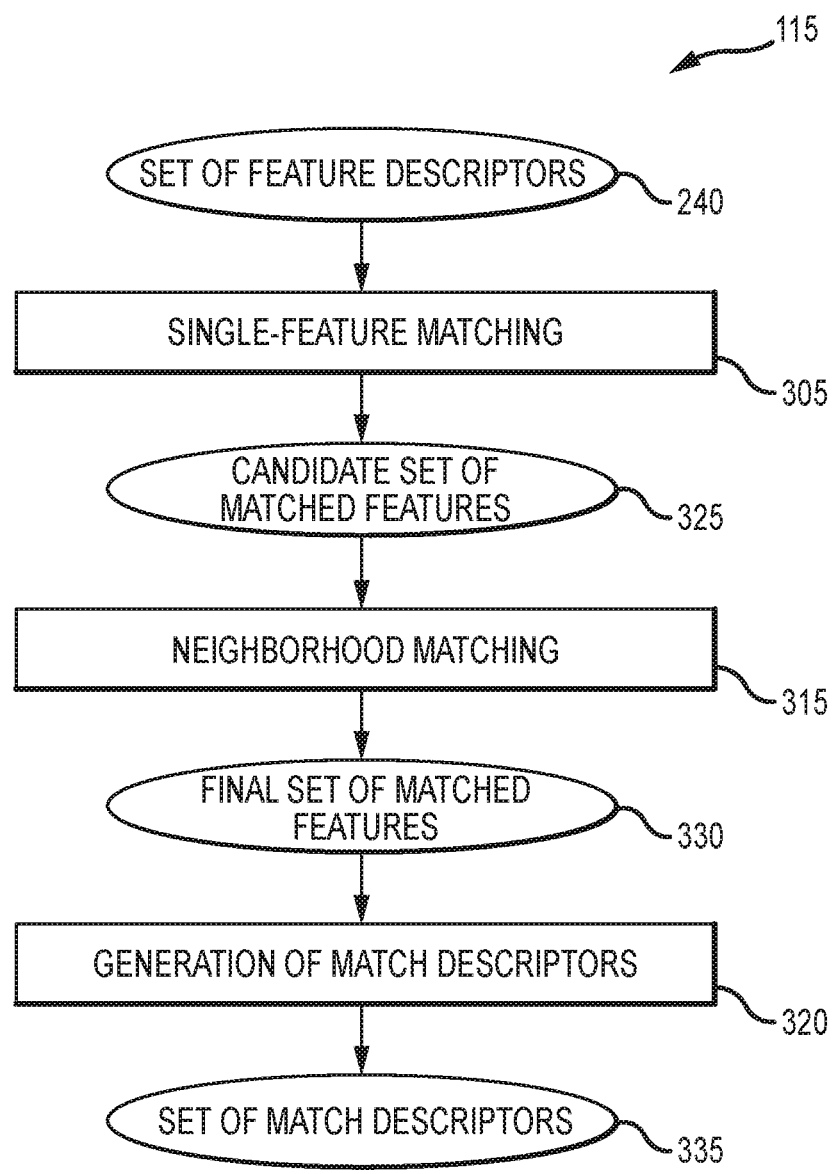
Figure 5A:
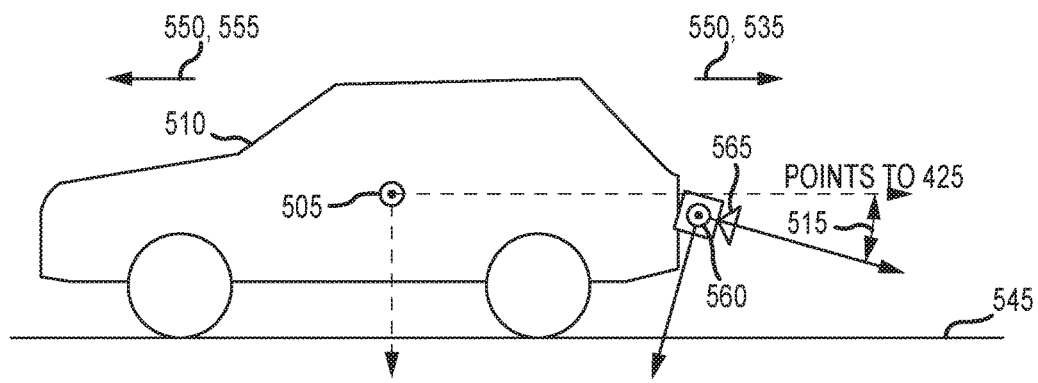
Figure 5B:
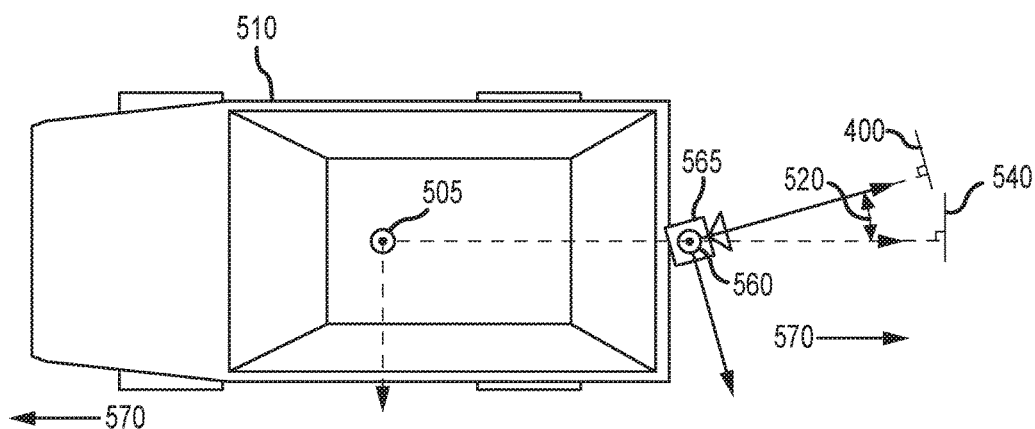
Figure 5C:
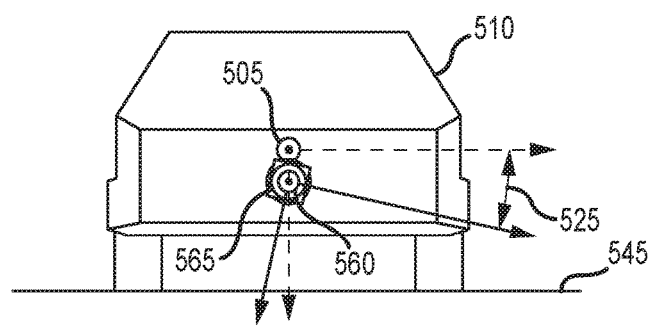
Figure 6:
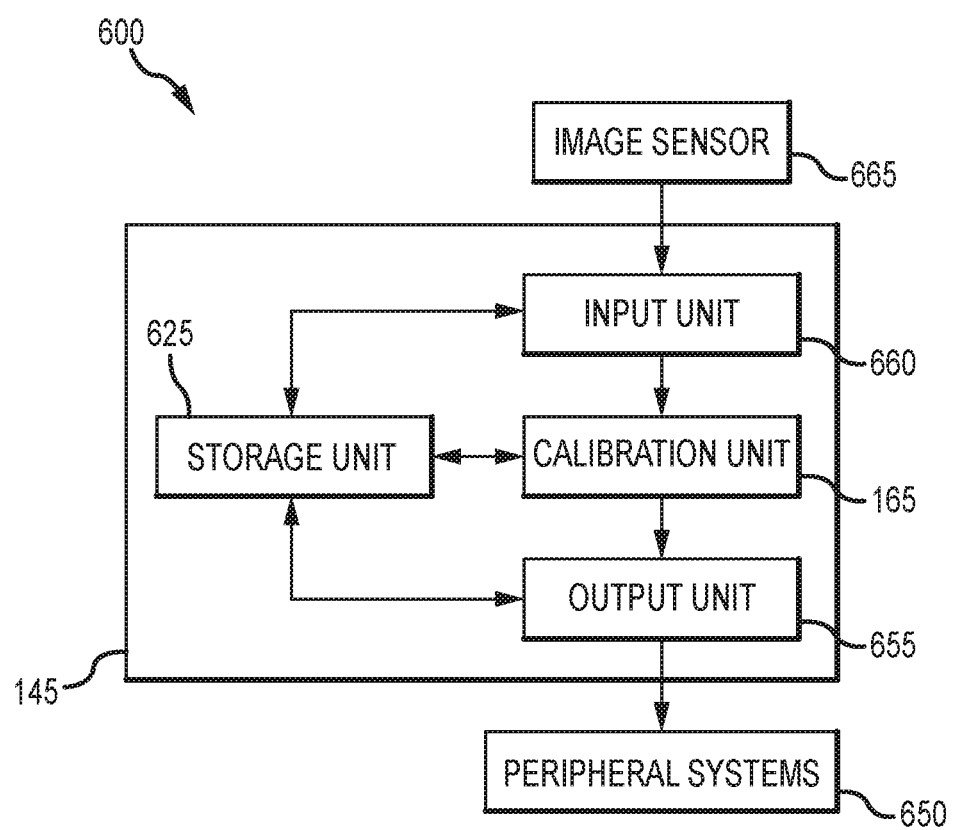
Figure 7:
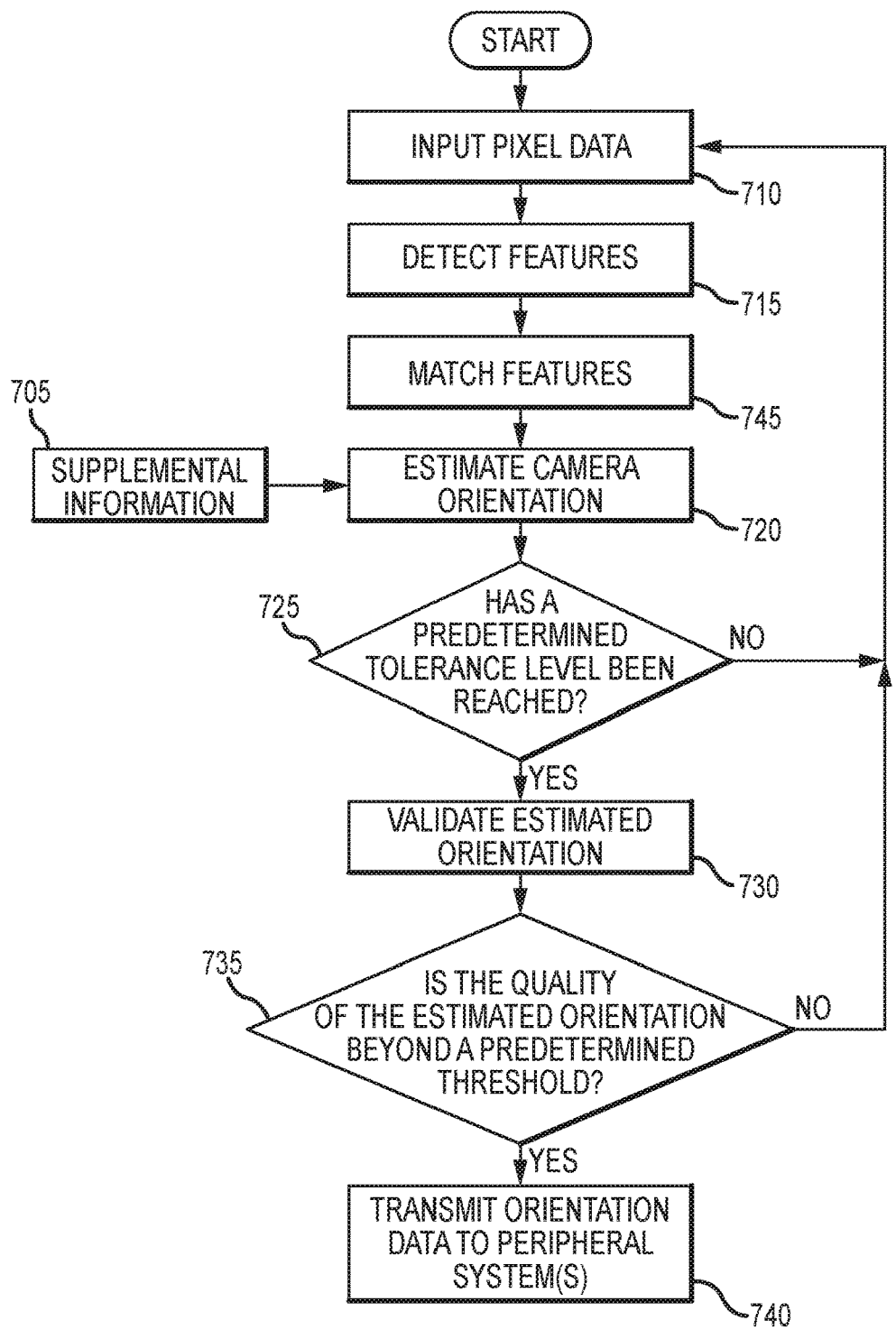

FIG. 1 representatively illustrates a block diagram of a self-calibration system in accordance with an exemplary embodiment of the present technology;

FIG. 2 representatively illustrates a block diagram of part of a self-calibration system in accordance with an exemplary embodiment of the present technology;

FIG. 3 representatively illustrates a block diagram of part of a self-calibration system in accordance with an exemplary embodiment of the present technology;

FIGS. 4A-J representatively illustrate camera frames used by the self-calibration system in accordance with an exemplary embodiment of the present technology;

FIGS. 5A-C representatively illustrate a camera coordinate system in relation to a vehicle coordinate system in accordance with an exemplary embodiment of the present technology;

FIG. 6 representatively illustrates a self-calibration camera system in accordance with an exemplary embodiment of the present technology; and FIG. 7 illustrates a process utilizing a self-calibration method in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various imaging sensors, image processing units, computations, algorithms, model fitting techniques, data partitioning, and the like, which may carry out a variety of functions. In addition, the present technology may be practiced in conjunction with any number of systems such as automotive and aviation systems, and the systems described are merely exemplary applications for the technology. Further, the present technology may employ any number of conventional techniques for detecting corners, measuring distances, calculating angles, and the like.

Methods and apparatus for an imaging system according to various aspects of the present technology may operate in conjunction with any suitable imaging system, such as a camera located on a vehicle. Referring now to FIGS. 1 and 6, in an exemplary embodiment of the present technology, methods and apparatus for an imaging system 600 may operate in conjunction with a self-calibrating imaging system including an image sensor 665, an image processing unit 145, and peripheral systems 650, and may implement a self-calibration method 100. The image processing unit 145 may detect features 110 in pixel data 105 received from the image sensor 665, match the detected features 115, perform orientation estimation 120 using the matched features, and perform validation of the estimated orientation 130. In various embodiments, supplemental information 705 (FIG. 7), such as vehicle speed and camera height, may also be used by the imaging system 600 and incorporated into the method 100.

In an exemplary embodiment, the image processing unit 145 may utilize pixel data 105 from the image sensor 665 comprising an array of pixels, wherein the pixels 450 (FIG. 4A) are arranged in rows and columns. The image processing unit 145 may utilize the pixel data 105 of a first image frame 405 (FIG. 4A) and a second image frame 410 (FIG. 4B), for example from the image sensor 665. In another embodiment, pixel data 105 of more than two image frames 400 may be utilized when more than two image frames 400 are available.

In various embodiments, the image processing unit 145 may comprise a calibration unit 165 configured to perform various image processing techniques and utilize algorithms to determine the orientation of the camera 565 in relation to a reference coordinate system 505 (FIG. 5). The calibration unit 165 may perform feature detection 110, feature matching 115, orientation estimation 120, and orientation validation 130 to determine the camera orientation.

In various embodiments, the image processing unit 145 and calibration unit 165 may be implemented with a programmable logic device, such as a field programmable gate array (FPGA) or any other device with reconfigurable digital circuits. In other embodiments, the image processing unit 145 and calibration unit 165 may be implemented in hardware using non-programmable devices. In alternative embodiments, the image processing unit 145 and calibration unit 165 may be formed partially or entirely within an integrated circuit in silicon using any suitable complementary metal-oxide semiconductor (CMOS) techniques or fabrication processes, in an ASIC, using a processor and memory system, or other suitable implementation.

The calibration unit 165 may perform feature detection 110 on the image data, such as data from each of the first and second image frames 405, 410 (FIGS. 4A-4B). In the present exemplary embodiment, feature detection 110 may comprise detecting at least two features within each of the first image frame 405 and the second image frame 410. In various embodiments, the calibration unit 165 may initially detect many features, for example more than 10 features. Once the features have been detected, the calibration unit 165 may provide image processing techniques to reject invalid features and keep valid features for further image processing.

The calibration unit 165 may, however, determine that there is not sufficient information to proceed to feature matching 115, such as fewer than two features are detected from pixel data 105 of the current image frame 400, in which case the calibration unit 165 may initiate a new round of feature detection 110 using the pixel data 105 of a new image frame 400. In various embodiments, the calibration unit 165 may not perform feature detection 110 on pixel data 105 belonging to the entire image frame 400, but on pixel data 105 belonging to part of the image frame 400. For example, the calibration unit 165 may skip pixel data 105 belonging to multiple rows at the top of an image frame 400.

Referring to FIG. 2, feature detection 110, via the calibration unit 165, may comprise detecting a set of candidate corners 210 by utilizing corner detection methods, such as the Harris corner detector and the Features from Accelerated Segment Test (FAST) detector, or any other suitable corner detection method. In an exemplary embodiment, the calibration unit 165 may perform feature detection 110 on normally encountered imagery, such as images containing brightness or color variations in the imaged road region that form corners, and may not require the use of specially designed targets, such as specific road surface signs, repeated textures, or symmetric dashed lane markers. For example, the calibration unit 165 may detect corners from a tiled surface, a newly patched road area, a shadow, and/or from any road markings with corners, such as lines to indicate a pedestrian walkway, a center lane marker, a speed bump marker, a turn lane marker, and the like.

Figure 4D:
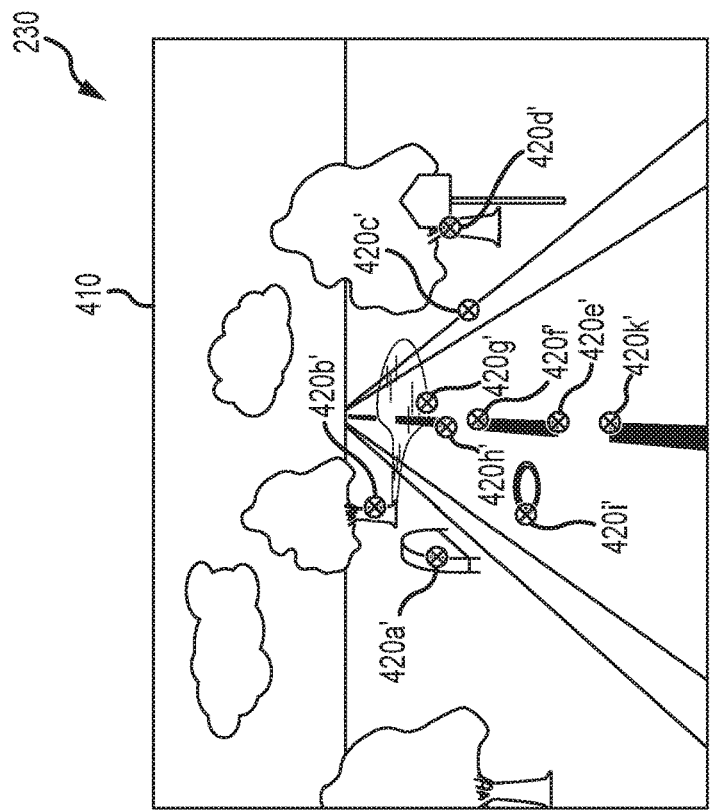
Figure 4C:
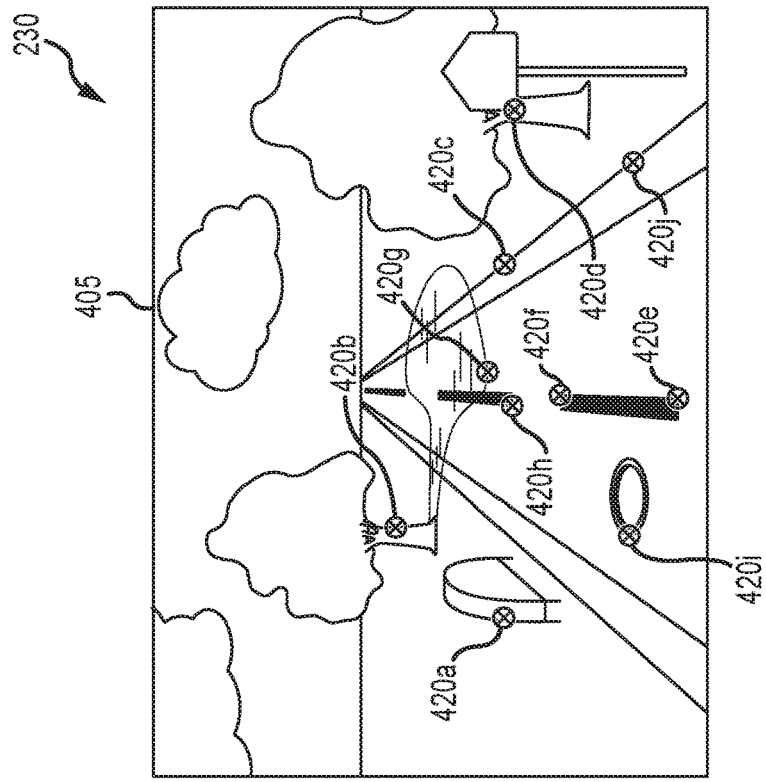

In various embodiments, the calibration unit 165 may generate a set of candidate corners 230 for each image frame 400 (FIGS. 4A-4B). The set of candidate corners 230 may comprise a plurality of detected features, such as a plurality of candidate corners. For example, FIGS. 4C and 4D illustrate the first image frame 405 and the second image frame 410, respectively, where the first image frame 405 comprises a set of detected features 420*a*-*j* (i.e. set of candidate corners 230), and the second image frame 410 comprises a set of detected features 420*a'*, 420*k'* (i.e. set of candidate corners 230).

Once the sets of candidate corners 230 have been generated, the calibration unit 165 may provide additional processing of pixel data 105 forming each candidate corner 230 and the pixel data 105 surrounding each candidate corner 230. For example, for each candidate corner in the set of candidate corners 230, the calibration unit 165 may perform estimation of incident-edge orientations 215, which determines the orientations of edges incident to the candidate corner 230 to distinguish a valid corner 235 from an invalid corner and reject the invalid corner. Such additional processing may be performed on each candidate corner 230 when that candidate corner 230 becomes available, or when all or part of the set of candidate corners 230 becomes available.

In the exemplary embodiment, for each candidate corner 230, the calibration unit 165 may determine the orientations of the incident edges 215. The calibration unit 165 may compute edge orientations for pixels forming the candidate corner 230 and/or in the neighborhood of the candidate corner 230, for example, through computed gradients in at least two distinct directions, where two of the directions may be orthogonal to each other. The calibration unit 165 may utilize the edge orientations to compute a set of dominant edge orientations. For example, the calibration unit 165 may compute the set of dominant edge orientations, by assembling a histogram of the edge orientations and then selecting the main peaks in the histogram. The calibration unit 165 then tests the validity of each pair in the set of dominant edge orientations, for example, by determining the number of pixels 450 (FIG. 4A) along each of the two edge orientations originating from the corner, and determining the agreement between the intensity/color transition across one edge and the intensity/color transition across the other edge.

Referring to FIGS. 4E-4F, in various embodiments, a candidate corner 230 (FIG. 2) which is determined to comprise at least one valid pair of dominant edge orientations may be defined as a valid corner 235. The calibration unit 165 may generate a set of valid corners 235 for each image frame 400 comprising a plurality of valid corners (i.e. valid features 420, 420'). For example, FIGS. 4E and 4F illustrate the first image frame 405 and the second image frame 410, where the first image frame 405 comprises a set of valid features 420*b*, 420*d*-*j* (i.e. set of valid corners 235), and the second image frame 410 comprises a set of valid features 420*b'*-*d'*, 420*f'*, 420*k'* (i.e. set of valid corners 235).

Referring again to FIG. 2, for each valid corner (i.e. valid feature 420, 420'), the calibration unit 165 may perform corner descriptor generation 220, from which a corner descriptor 240 may be generated comprising information related to the valid corner's properties, such as a position, an orientation, a subtended angle, and a contrast, wherein the contrast is defined with respect to the intensity/color transition between the pixels inside the corner and the pixels outside the corner. In other embodiments, the corner descriptor 240 may also comprise information related to the valid corner's neighborhood, such as a list of indices of neighboring corners, where the neighborhood may be defined according to a predefined distance metric. The predefined distance metric may be a spatial distance metric, a spectral distance metric, a combined spatial and spectral distance metric, and the like. A valid corner's neighborhood information in its corner descriptor 240 may be generated when the set of valid corners 235 for an image frame 400 becomes available or before neighborhood matching 315 (explained below, FIG. 3) is performed. In an exemplary embodiment, the method 100 may not require that the entire image frame 400, a downscaled frame, or an upscaled frame be stored in a storage unit 625 (FIG. 6) to perform feature detection 110. For example, the calibration unit 165 may transmit pixel data 105 belonging to part of an image frame 400 to the storage unit 625, such that the pixel data 105 may be stored without the use of a frame buffer, when performing feature detection 110. In various embodiments, the calibration unit 165 rectifies the valid features 420, 420' to account for lens distortion prior to feature matching 115. For example, the position of a valid feature 420, 420' may be rectified to the undistorted image coordinates. The subtended angle and the orientation of the valid feature 420, 420' may also be rectified to the undistorted image coordinates.

The calibration unit 165 may perform feature matching 115 between the first image frame 405 and the second image frame 410. Feature matching 115 may comprise comparing the valid features, for example 420*b*, 420*d-j* of the first image frame 405 with the valid features, for example 420*b'*-d', 420*f'*, 420*k'* of the second image frame 410, and identifying pairs of valid features that have similar properties, wherein each pair comprises one valid feature 420 from the first image frame 405 and the corresponding valid feature 420' from the second image frame 410. A pair of valid features that have similar properties is referred to as a pair of matched features 455 hereafter. In an exemplary embodiment, the valid feature may be the valid corner, however, other embodiments may detect features other than corners.

In an exemplary embodiment, feature matching 115 may comprise comparing each valid corner from the first image frame 405 with each valid corner from the second image frame 410. A pair of valid corners with similar properties may be determined as a pair of matched features 455. In an exemplary embodiment, referring now to FIG. 3, feature matching 115 may comprise single-feature matching 305 to form the candidate set of matched features 325 and neighborhood matching 315 to form the final set of matched features 330. Single-feature matching 305 may comprise matching the valid features 420, 420' based on individual properties of each valid feature, such as the position, orientation, subtended angle, and contrast. For example, referring to FIGS. 4G-4H, the valid features 420 of the first image frame 405 may be compared with the valid features 420' of the second image frame 410 and then be determined as pairs of matched features 455(1)-(7). Conversely, neighborhood matching 315, described below, may comprise matching the valid features 420, 420' based on the neighborhood properties of each valid feature.

Figure 4H:
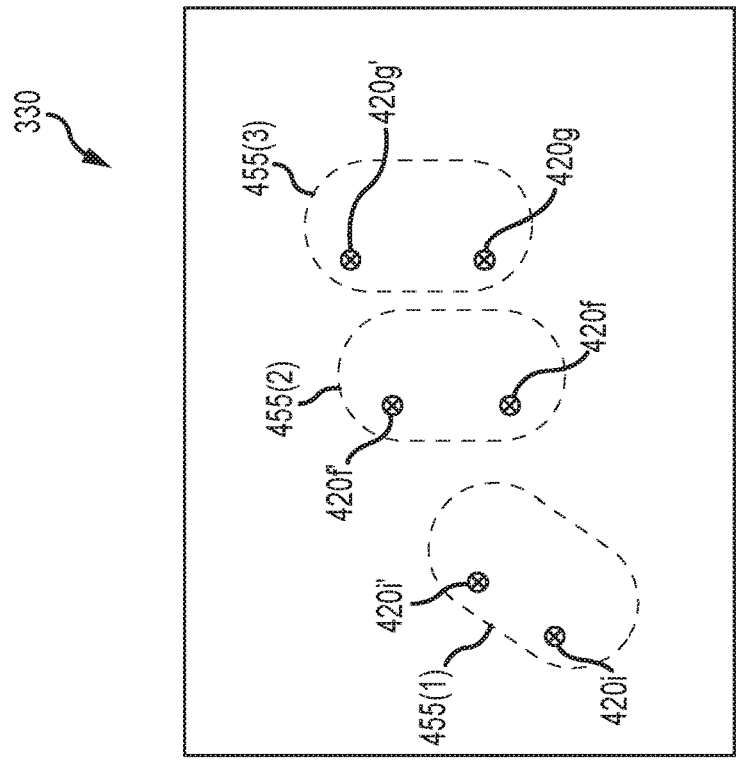
Figure 4G:
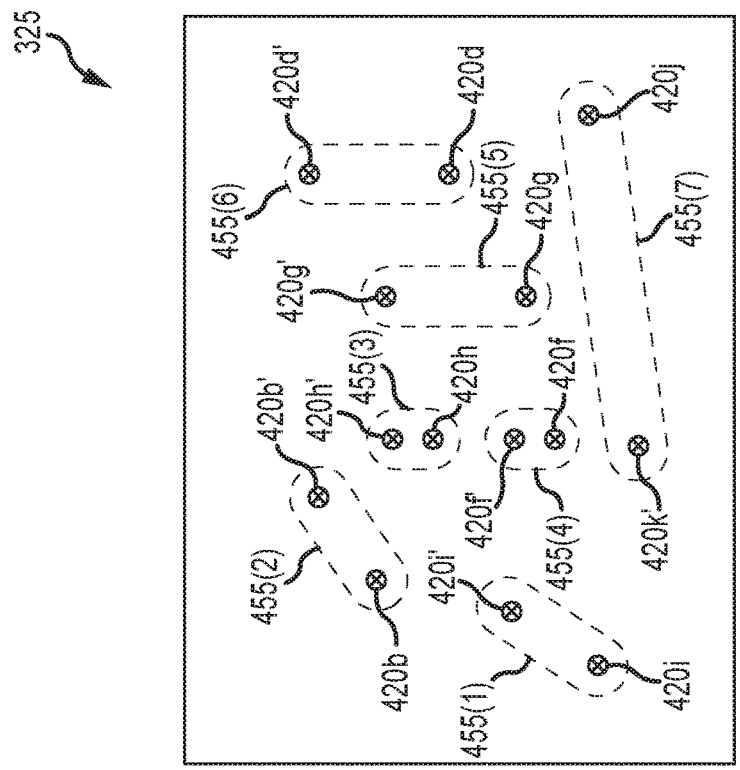

Valid features 420 of the first image frame 405 may or may not have a match from the valid features 420' of the second image frame 410. For example, as illustrated in FIG. 4G, demonstrating superimposing the features of FIGS. 4E and 4F, the valid feature 420*b* of the first image frame 405 and the valid feature 420*b'* of the second image frame 410 may be determined as a pair of matched features 455(2) because they have similar properties; however, the valid feature 420*i* of the first image frame 405 and the valid feature 420*b'* of the second frame 410 may not be determined as a pair of matched features because they have different properties.

In various embodiments, the calibration unit 165 may determine that there is not sufficient information to proceed to performing orientation estimation 120, such as less than two pairs of matched features 455 are determined, where in such case, the calibration unit 165 may initiate a new round of feature detection 110 using the pixel data 105 of a new image frame 400.

The pairs of matched features 455 may be included in a candidate set of matched features 325. The pairs of matched features 455 may be also included in a final set of matched features 330.

For each pair of matched features 455(1)-(7) in the candidate set of matched features 325, the calibration unit 165 may perform neighborhood matching 315. Neighborhood matching 315 may comprise, for each pair of matched features in the candidate set of matched features 325, determining whether their neighborhoods match 315 with each other based on the candidate set of matched features 325 and the topologies of the neighborhoods. For each valid feature 420, 420' in each pair of matched features in the candidate set of matched features 325, the topology of its neighborhood may be determined from that feature's descriptor 240 and its neighboring features' descriptors 240. In an exemplary embodiment, for each valid feature 420, 420' in each pair of matched features in the candidate set of matched features 325, the topology of its neighborhood may be a spatial topology, which represents the relative position of each neighboring feature with respect to that feature. Each pair of matched features 455 in the candidate set 325 that also has matched neighborhoods is included in the final set of matched features 330.

Two neighborhoods may be determined as matched neighborhoods if they have at least one pair of features that is in the candidate set of matched features 325 and if at least one pair of features has similar neighborhood topologies. The pairs of matched features 455(1)-(7) may not all be included in the final set of matched features 330. For example, only a subset of the pairs of matched features 455 may be included in the final set of matched features 330. For example, as illustrated in FIG. 4H, demonstrating superimposed features from two image frames, the final set of matched features 330 may only include valid features 420*i*, 420*i'*, 420*f*, 420*f'*, 420*g*, 420*g'*.

For each pair of matched features 455(1)-(7) within the final set of matched features 330, the calibration unit 165 may generate match descriptors 320, such that each pair of matched features 455(1)-(7) has an associated match descriptor 335 The match descriptor 335 may comprise information related to the pair of matched features within the final set of matched features 330. For example, the match descriptor 335 may comprise all or part of the information in each of the matched features' descriptors 240. Conversely, the match descriptor 335 may comprise an index of each of the matched features indicating their locations within their respective sets of feature descriptors 240. The match descriptor 335 may also comprise a similarity score, which indicates the degree of similarity between the two matched features. The match descriptor 335 may also comprise a scale factor, which indicates the change of scales between the two matched features.

In an exemplary embodiment, the match descriptor 335 may comprise the positions of each matched feature and the scale factor. In an exemplary embodiment, for each pair of matched features within the final set of matched features 330, its scale factor may be determined as a function of the matched neighborhoods of the two features in that pair. For example, the function may be a function computing the ratio between measurements of the sizes of the matched neighborhoods. In an exemplary embodiment, the calibration unit 165 may not require that the entire image frame 400, a downscaled frame, or an upscaled frame be stored in the storage unit 625 to perform feature matching 115. For example, the calibration unit 165 may store the set of corner descriptors 240 in the storage unit 625 without the use of a frame buffer, when performing feature matching 115.

Referring now to FIGS. 1 and 5, the calibration unit 165 may perform orientation estimation 120 of the camera 565 in relation to the reference coordinate system 505. In the exemplary embodiment, only those features 420, 420' within the final set of matched features 330 may be used to perform orientation estimation 120 of the camera's rotation angles, comprising a pitch angle 515, a yaw angle 520, and a row angle 525 (where the pitch angle 515, the yaw angle 520, and the row angle 525 may be collectively defined as a camera coordinate system 560) with respect to the vehicle coordinate system 505. The final set of matched features 330 may be identified through the set of match descriptors 335 and the set of corner descriptors 240 of the matched features in the final set of matched features 330.

Referring to FIGS. 4-5, the orientation estimation 120 may comprise estimating an epipole 425 utilizing the final set of matched features 330. In various embodiments, epipole estimation 430 may comprise estimating a general moving direction 550 of the camera 565 using the change of scales between the matched features 330. For example, if the feature 420 from the first image frame 405, for example as illustrated in FIG. 4E, is of smaller scale than the matched feature 420' of the second image frame 415, for example as illustrated in FIG. 4I, then the camera 565 is moving toward 535 the structures in the scene that form the features. Conversely, if the feature 420 from the first frame 405, for example as illustrated in FIG. 4E, is of larger scale than the matched feature 420' of the second image frame 410, for example as illustrated in FIG. 4F, then the camera 565 is moving away 555 from the structures in the scene that form the features. The camera's 565 general moving direction 550 may be determined as the direction 535 or 555 that a majority of the pairs of matched features 455 in the final set of matched features 330 agree upon. Those pairs of matched features 455 that do not agree with the camera's 565 general moving direction 550 may be removed from the final set of matched features 330.

Referring to FIGS. 4J and 5, when the camera 565 undergoes linear motion (i.e., translation) between two image frames and the camera's 565 linear motion direction 570 is not parallel to the image plane 400, the epipole 425 may then be computed as the point on the image plane that minimizes the distance to the lines formed by each pair of matched features 455 in the final set of matched features 330 (i.e. those pairs of matched features 330 that also agree with the camera's 565 general moving direction 550). Various light-weight model fitting techniques, such as Random Sample Consensus (RANSAC) and RANSAC-like methods, may be applied to computation of the epipole 425.

Referring to FIG. 5, estimating the orientation 120 may further comprise extracting the pitch angle 515, the yaw angle 520, and the roll angle 525 (i.e. rotation angles) from the epipole 425. For example, if the roll angle 525 is assigned to zero or a predetermined number, then the pitch and yaw angles 515, 520 may be calculated from the epipole 425. Conversely, any rotation angle may be initially assigned to zero or a predetermined number with subsequent calculation of the remaining angles from the epipole 425.

In a linear motion (i.e., translation) of the vehicle 510 between two image frames, if the geometric relationship between the camera 565 and the vehicle 510 does not change in the linear motion, and if the reference coordinate system 505 is defined as having the vehicle's linear motion direction 570 along one of the reference coordinate system's 505 axes but not parallel to the image plane 400, then the epipole 425 and the three rotation angles 515, 520, and 525 may be related as: $g*e=K*R(u, v, w)*t=K*[R(u, v, w)]_{:,i}*[t]_i$, where g denotes a scaling factor; e denotes the epipole 425; K denotes the camera intrinsic matrix; R(u, v, w) denotes the rotation matrix representing the rotation from the reference coordinate system 505 to the camera coordinate system 560 and is defined by the pitch angle u 515, the yaw angle v 520, and the roll angle w 525 following a predefined rotation order; t is the translation vector, the sign of which is determined by the camera's general moving direction 550; $[\ ]_{:,i}$ denotes i-th column of a matrix; $[\ ]_i$ denotes i-th element of a vector; * denotes multiplication. For example, the i-th axis may be the z-axis, if the rotation order is: first, rotation about x-axis; second, rotation about y-axis; third, rotation about z-axis. The camera intrinsic matrix may be either derived from nominal values of the camera's 565 intrinsic parameters or obtained from intrinsic parameter calibration of the camera 565, wherein the intrinsic parameters may comprise camera focal length, principal point, pixel aspect ratio, pixel skew, and lens distortion coefficients. Once the epipole 425 is computed, the rotation angles 515, 520, and 525 may be calculated using this relationship. The reference coordinate system's 505 origin may be defined to be coincident with the camera coordinate system's 560 origin. If not, the reference coordinate system's 505 origin may be assumed to be coincident with the camera coordinate system's 560 origin in all the calculations.

Referring to FIGS. 1, 4H and 5A-C, orientation estimation 120 may further comprise computing the three-dimensional (3D) coordinates for each valid feature 420, 420' within the final set of matched features 330. For example, the 3D coordinates for each valid feature 420, 420' within the final set of matched features 330 may be computed by projecting the final set of matched features 330 from each of the first and second image planes 405, 410 into the reference coordinate system 505, for example, the vehicle coordinate system by utilizing the current estimate of the rotation angles 515, 520, and 525 and triangulation techniques.

Orientation estimation 120 may further comprise projecting the 3D coordinates of the final set of matched features 330 onto a two-dimensional (2D) plane 540 which is perpendicular to the vehicle's moving direction 570, where the projection of a 3D coordinate onto the 2D plane 540 forms a point on the 2D plane 540 corresponding to each valid feature 420, 420' within the final set of matched features 330. The projection of a 3D coordinate onto the 2D plane 540 may be an orthographic projection.

Orientation estimation 120 may further comprise determining whether the valid features 420, 420' within the final set of matched features 330 are positioned on a reference plane 545, for example a ground plane. In the exemplary embodiment, determining the position of the final set of matched features 330 with respect to the reference plane 545 comprises fitting a line through the points corresponding to each valid feature 420, 420' within the final set of matched features 330 on the 2D plane 540, and calculating a slope from the fitted line. Fitting a line may be achieved by various light-weight model fitting techniques, such as RANSAC and RANSAC-like methods.

In one exemplary embodiment, orientation estimation 120 may comprise an iterative process, which may comprise repeating the steps: 1) computing the 3D coordinates for each valid feature 420, 420' within the final set of matched features 330; 2) projecting the 3D coordinates of the set of matched features onto a 2D plane 540; 3) fitting a line through the points corresponding to each valid feature 420, 420' within the final set of matched features 330 on the 2D plane 540; 4) adjusting the roll angle 525 from the calculated slope of the fitted line to form an adjusted roll angle 525'; and 5) updating the pitch and yaw angles 515, 520 using the epipole 425 and the adjusted roll angle 525' until the absolute value of the slope of the fitted line is within a predetermined tolerance level. In the exemplary embodiment, the predetermined tolerance level may be a number smaller than a desired accuracy of the calibrated rotation angles 515, 520, 525. For example, if the calibrated rotation angles 515, 520, 525 of the camera 565 are to be within 1 degree error with respect to the reference coordinate system 505, then the tolerance level may be defined to be at most tan(1 degree), wherein tan( ) is the trigonometric tangent function.

In other embodiments, orientation estimation 120 may conclude once the number of iterations reaches a predetermined limit. For example, the predetermined limit may be less than 10 iterations, or any other number to achieve a desired result. If the orientation estimation 120 cannot converge within the predetermined number of iterations (i.e. the absolute value of the slope of the fitted line is not within a predetermined tolerance level), the calibration method 100 and calibration unit 165 may fetch pixel data 105 of a new image frame 400 and perform calibration using the pixel data 105 of the new image frame 400 and the set of feature descriptors 240 from one of the previous frames. When there are more than one set of feature descriptors 240 from previous frames, each set may be used in the new round of calibration.

In various embodiments, when performing orientation estimation 120 using the matched features 120, the calibration unit 165 may determine that there is not sufficient information to proceed to validating the estimated orientation 130, such as no epipole 425 is found or orientation estimation 120 does not converge to a camera orientation at termination. In such a case, the calibration unit 165 may initiate a new round of feature detection 110 using the pixel data 105 of a new image frame 400.

In various embodiments, the calibration unit 165 may be configured to validate the estimated orientation 130, such as using homography techniques. For example, validating the estimated orientation 130 using homography techniques may comprise computing a reference-plane-induced inter-frame homography matrix in the reference coordinate system 505 from the estimated rotation angles 515, 520, 525. The reference-plane-induced inter-frame homography matrix in the reference coordinate system 505 may be a composition of the camera 565 intrinsic matrix, the camera 565 rotation matrix in the reference coordinate system 505 defined by the estimated rotation angles 515, 520, 525, and the camera translation vector (i.e., movement amount) normalized by the camera 565 height in the reference coordinate system 505. The only unknown may be the camera 565 translation vector normalized by the camera 565 height, which may be estimated from the matched features 455 in the final set of matched features 330 that were determined to be on the reference plane 545.

Validating the estimated orientation 130 using homography techniques may further comprise determining the quality of the estimated orientation 135 from the current pair of image frames. For example, determining the quality of the estimated orientation 135 may comprise computing statistics from a homography matrix and computing a reprojection error of the final set of matched features 330 that were determined to be on the reference plane 545 using the homography matrix. The quality of the calibration may be represented as a numeric quality score defined using the statistics and the reprojection error.

In an exemplary embodiment, the statistics from a homography matrix may be metrics that measure the consistency of multiple estimates of the translation vector of the camera 565 in the reference coordinate system 505 between two image frames, wherein each estimate may be obtained from one pair of matched features in the final set of matched features 330 that were determined to be on the reference plane 545. In an exemplary embodiment, the reference plane 545 comprises the ground plane.

In various embodiments, when validating the estimated orientation 130, the calibration unit 165 may not be able to complete orientation validation 130. In such a case, a new round of feature detection 110 may be initiated using the pixel data 105 of a new image frame 400.

Once the camera rotation angles 515, 520, 525 have been validated, the calibration unit 165 may transmit a validated camera orientation 135, comprising the pitch, yaw, and roll angles 515, 520, 525 with respect to the reference coordinate system, to an output unit 655.

Referring now to FIGS. 1, 4, and 6, a system 600, utilizing the method 100 as described above, may comprise the image sensor 665 and the image processing unit 145.

The image processing unit 145 may further comprise the storage unit 625. The storage unit 625 may temporarily store pixel data 105 and intermediate data. In various embodiments, the entire image frame 400, a downscaled frame, or an upscaled frame may not be stored to a frame buffer located within the storage unit 625, but may instead store pixel data 105 belonging to part of an image frame 400, such as pixel data 105 belonging to a few rows of an image frame 400. In various embodiments, information about the detected features 420, 420' for each of the first and second image frames 405, 410 such as the set of corner descriptors 240, the set of match descriptors 335, may be stored in the storage unit 625. Estimates of camera orientation 135 may also be stored in the storage unit 625.

In various embodiments, the storage unit 625 may comprise random-access memory, non-volatile memory or any other memory device suitable for the particular application. The storage unit 625 may comprise one or more memory cells, such as dynamic random access memory cells (DRAM), static random access memory cells (SRAM), or bistable flip-flops. The storage device may be implemented using transistors or any other suitable semiconductor devices.

In the exemplary embodiment, the image processing unit may further comprise the output unit 655. The output unit 655 may transmit the camera orientation 135 to a peripheral system 650. The output unit 655 may convert the camera orientation 135 from Euler angle representation 515, 520, 525 (FIG. 5) to other representations, such as rotation matrix, quaternion, or axis-angle, before transmitting the camera orientation 135 to the peripheral systems 650, such as an ADAS. The output unit 655 may aggregate multiple estimates of the camera orientation 135 computed from multiple frame pairs before transmitting the aggregated camera orientation 135 to the peripheral systems 650. For example, multiple estimates of the camera orientation 135 may be averaged using their respective quality scores as weights, wherein the average may be taken on the Euler angles, on the corresponding rotation matrices, on the corresponding quaternions, or on the corresponding axis-angle representations.

In an exemplary embodiment, the peripheral system 650 may use the camera orientation 135 to compensate for the camera 565's rotational deviation from the reference coordinate system 505. For example, a surround view system may use the transmitted camera orientation 135 to further process pixel data 105 from at least two image frames 400, such as to perform image stitching, to perform 3D reconstruction, and/or to determine one or more regions of interest in an image, such as the region in an image that corresponds to the reference plane 545, to produce a surround view output. The surround view output may then be transmitted to other peripheral systems 650, such as other systems in ADAS, such as collision avoidance system and lane departure warning system, where these other systems in the ADAS may alert the driver using visual, auditory, or sensory alerts. For example, if the ADAS detects that the driver is approaching another vehicle, the ADAS may sound an alarm, flash a light, and/or vibrate the seat. The ADAS may also be used to signal an alert to a driver of the vehicle to alert the driver to a particular road condition, such as objects or pedestrians in the path of the vehicle, departure from the current lane, and the like.

In other embodiments, the camera orientation 135 may be used to physically realign the camera 565 to a desired orientation with respect to the reference coordinate system 505. For example, physical realignment of the camera 565 may be achieved by mechanically rotating the camera 565 by an amount determined as the difference between its calibrated orientation 135 and the desired orientation within the reference coordinate system 505.

Referring now to FIGS. 1, 6 and 7, in an exemplary embodiment of the present technology, the self-calibration method 100 and system 600 may be implemented by the on-vehicle camera 565 capturing sequential image frames 400 (FIGS. 4A-B), for example the first and second image frames 405, 410, and streaming the pixel data 105 from these frames 400 to the storage unit 625. The image processing unit 145, having access to the storage unit 625, may receive the pixel data 105 (710) and perform feature detection 110 (715). Once features are detected from pixel data 105 belonging to at least two image frames, the image processing unit 145 may then perform feature matching 115 (745).

Once features within each of the first and second image frames 405, 410 have been detected and matched, the image processing unit 145 may then estimate the camera orientation 515, 520, 525 (720). If a predetermined tolerance level is reached (725), the process continues where the estimated orientation may be validated (730) and the quality of the estimated orientation may be calculated (735). If the predetermined tolerance level is not reached, a third image frame (not shown), or a new subsequent image frame, may be utilized where feature detection 110 (715) and feature matching 115 (745) are then performed on the pixel data 105 from the second image frame 410 and the pixel data 105 from the third image frame, and/or on the pixel data 105 from the first image frame 405 and the pixel data 105 from the third image frame. If the quality of the estimated orientation is beyond a predetermined threshold (735), the camera orientation 515, 520, 525 with respect to the reference coordinate system 505 may then be utilized by the peripheral systems 650 (740). If the quality of the estimated orientation is not beyond a predetermined threshold (735), a new subsequent image frame 400 may be utilized to restart the process.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging apparatus, comprising:
   an image sensor comprising a pixel array configured to generate pixel data;
   a storage unit coupled to the image sensor and configured to store the pixel data; and
   an image processing unit communicatively coupled to the image sensor and the storage unit and configured to:
   receive a first image frame of pixel data and a second image frame of pixel data, wherein the first image frame and the second image frame are captured sequentially;
   detect at least two features in the first image frame and at least two features in the second image frame;
   form matched features by matching the at least two features of the first image frame to the at least two features of the second image frame;
   perform orientation estimation comprising:
   calculating an epipole from the matched features;
   estimating a rotation angle in relation to the epipole;
   determining whether the matched features appear on a reference plane by calculating a 3D coordinate for each of the matched features in a reference coordinate system; and
   updating the estimated rotation angle using the calculated 3D coordinate for each of the matched features and model fitting techniques until a predetermined tolerance level is reached;
   validate the estimated orientation in the reference coordinate system using homography; and
   estimate an average camera orientation by weighted averaging of multiple estimates of the camera orientation using quality scores as weights, and wherein a quality score measures the consistency of multiple estimates of a translation vector of the camera in the vehicle coordinate system between two image frames.

2. The imaging apparatus according to claim 1, wherein the reference plane comprises a ground plane.

3. The imaging apparatus according to claim 1, wherein the reference coordinate system comprises a vehicle coordinate system.

4. The imaging apparatus according to claim 1, wherein detecting at least two features comprises:
   determining an orientation of an edge incident to a detected corner and rejecting an invalid corner; and
   generating a corner descriptor for the detected corner, wherein the corner descriptor comprises at least one of a position, an orientation, a subtended angle, a contrast, and an index of a neighboring corner.

5. The imaging apparatus according to claim 1, wherein forming matched features comprises:
   matching features based on the properties of neighboring features; and
   generating a match descriptor for each pair of matched features, wherein the match descriptor comprises a ratio between measurements of the sizes of the matched neighborhoods.

6. The imaging apparatus according to claim 1, wherein calculating an epipole from the matched features comprises determining a direction of movement using a change of scales between the matched features.

7. The imaging apparatus according to claim 1, wherein the rotation angle comprises at least one of: a pitch angle, a yaw angle, and a roll angle.

8. The imaging apparatus according to claim 1, wherein validating the estimated orientation in the reference coordinate system using homography comprises measuring the consistency of multiple estimates of a translation vector in the reference coordinate system between two image frames.

9. A method for calibrating a camera's orientation relative to a reference coordinate system comprising:
   detecting at least two features on an image plane for each of a first image frame and a second image frame generated by the camera;
   forming matched features, comprising matching at least two features of the first image frame to at least two features of the second image frame;
   iteratively estimating a rotation angle of the camera utilizing at least two pairs of the matched features and a calculated epipole until a predetermined tolerance level is reached;
   validating the estimated rotation angle in the reference coordinate system; and
   estimating an average camera orientation by weighted averaging of multiple estimates of the camera orientation using quality scores as weights, and wherein a quality score measures the consistency of multiple estimates of a translation vector of the camera in the vehicle coordinate system between two image frames.

10. The method for calibrating a camera's orientation according to claim 9, wherein the rotation angle comprises at least one of: a pitch angle, a yaw angle, and a roll angle.

11. The method for calibrating a camera's orientation according to claim 9, wherein detecting at least two features comprises:
    determining an orientation of an edge incident to a detected corner and rejecting an invalid corner; and
    generating a corner descriptor for the detected corner, wherein the corner descriptor comprises at least one of a position, an orientation, a subtended angle, a contrast, and an index of a neighboring corner.

12. The method for calibrating a camera's orientation according to claim 11, wherein the position, the orientation, and the subtended angle are rectified to account for lens distortion prior to feature matching.

13. The method for calibrating a camera's orientation according to claim 9, wherein forming matched features comprises:
    matching features based on the properties of neighboring features; and
    generating a match descriptor for each pair of matched features, wherein the match descriptor comprises a ratio between measurements of the sizes of the matched neighborhoods, wherein each neighborhood is formed by at least two features.

14. The method for calibrating a camera's orientation according to claim 9, wherein calculating an epipole from the matched features comprises determining a direction of movement of the camera using a change of scales between the matched features.

15. The method for calibrating a camera's orientation according to claim 9, wherein estimating the camera rotation angle further comprises computing a value for a first rotation angle, and computing a remaining rotation angle from the epipole.

16. The method for calibrating a camera's orientation according to claim 15, wherein computing a value for the first rotation angle comprises projecting 3D coordinates corresponding to at least one pair of matched features onto a 2D plane to form a set of points and fitting a line through the set of points.

17. The method for calibrating a camera's orientation according to claim 16, further comprising adjusting at least one rotation angle according to a slope of the fitted line.

18. The method for calibrating a camera's orientation according to claim 9, wherein validating the estimated camera rotation angle comprises measuring the consistency of multiple estimates of a translation vector in the reference coordinate system between two image frames.

19. A system for calibrating an on-vehicle camera's orientation relative to a vehicle coordinate system when the vehicle undergoes linear motion comprising:
   an image sensor comprising a pixel array for capturing an image frame, wherein the pixel array comprises pixels arranged in rows and columns;
   an image processing unit configured to receive sequential rows of pixel data of a
   first image frame and a second image frame, comprising;
   a calibration unit configured to:
      detect at least two features on an image plane for each of the first image frame and the second image frame;
      form matched features by matching the at least two features of the first image frame to the at least two features of the second image frame;
      iteratively estimate the camera orientation utilizing the matched features and a
      calculated epipole until a predetermined tolerance level is reached; and
      validate the estimated camera orientation in the vehicle coordinate system; and
   an output unit configured to transmit the validated camera orientation to a peripheral system and estimate an average camera orientation by weighted averaging of multiple estimates of the camera orientation using quality scores as weights, and wherein a quality score measures the consistency of multiple estimates of a translation vector of the camera in the vehicle coordinate system between two image frames.

* * * * *